July 2, 1963   L. G. SKALSEY   3,095,782
AUTOMATIC LOADING MECHANISM FOR GEAR FINISHING MACHINES
Filed Sept. 22, 1958   3 Sheets-Sheet 1

INVENTOR.
LILY G. SKALSEY
BY
ATTORNEYS

July 2, 1963   L. G. SKALSEY   3,095,782
AUTOMATIC LOADING MECHANISM FOR GEAR FINISHING MACHINES
Filed Sept. 22, 1958   3 Sheets-Sheet 3

INVENTOR.
LILY G. SKALSEY
BY Whittemore,
Hulbert & Belknap
ATTORNEYS

United States Patent Office 3,095,782
Patented July 2, 1963

3,095,782
AUTOMATIC LOADING MECHANISM FOR GEAR FINISHING MACHINES
Lily G. Skalsey, Detroit, Mich., assignor to National Broach & Machine Company, Detroit, Mich., a corporation of Michigan
Filed Sept. 22, 1958, Ser. No. 762,560
10 Claims. (Cl. 90—1.6)

The present invention relates to automatic loading mechanism for gear finishing machines.

It is an object of the present invention to provide apparatus for automatically loading, finishing, and automatically unloading a sequence of gears.

More specifically, it is an object of the present invention to provide apparatus comprising a rotary tool support having a gear-like tool thereon, a rotary work support adapted to support a gear in mesh with the tool for rotation, said work support being axially movable to move a gear carried thereby axially out of mesh with the tool, a loading chute, a transfer device movable to transfer gears successively from the loading chute into a position in mesh with the tool, means for driving one of said rotary supports in rotation to finish a gear carried by said work support, means for thereafter moving said work support axially to move a finished work gear carried thereby out of mesh with the tool, and means for releasing the finished work gear from the work support.

It is a further object of the present invention to provide, in combination with automatic loading mechanism including laterally offset loading and unloading chutes, work support means comprising a rotary member movable axially to engage and support a work gear located in mesh with a gear-finishing tool and retractable to shift the finished work gear in an axial direction out of mesh with the work gear, and means for releasing the gear from the rotary member in a position to be received in said unloading chute.

It is a further object of the present invention to provide mechanism as described in the preceding paragraph in which the work support means comprises separately movable head and tailstocks, fluid actuated piston and cylinder devices connected to rotary members mounted in each of said stocks, the piston and cylinder device connected to said headstock having a greater effective area than that of said tailstock, means automatically operable in timed relation to operation of a transfer device operable to move a gear into mesh with a gear-like finishing tool to advance the rotary member of the headstock to enter an opening in the work gear, means operable thereafter to admit fluid to the piston and cylinder device associated with the tailstock to advance the rotary member thereof into engagement with the work gear to clamp the same on a shoulder on the rotary member of the headstock, means operable upon completion of the finishing operation to release fluid pressure in the piston and cylinder device associated with the headstock to permit the piston and cylinder device associated with the tailstock to shift the rotary member associated with the headstock and the work gear axially out of mesh with the tool, means operable thereafter effective to admit fluid under pressure to the piston and cylinder device associated with the headstock to shift the rotary member thereof further so as to withdraw the rotary member from the opening in the work gear and thus to release the finished work gear.

It is a further object of the present invention to provide apparatus as described in the preceding paragraph in which rigid stop means are provided in both of said piston and cylinder devices to control the extent of movement of the pistons in the cylinders thereof.

Other objects and features of the invention will become apparent as the description proceeds, especially when taken in conjunction with the accompanying drawings, illustrating preferred embodiments of the invention, wherein.

The present invention is associated with a gear finishing machine of a now well known type in which a work gear W is rotatably supported in mesh with a gear-like finishing tool T mounted with its axis crossing the axis of the gear. Suitable means are provided for effecting rotation of the tool and its rotation imparts rotation to the work gear W. In addition, the work gear W is mounted on a table 10 mounted for reciprocation in a direction which occupies a plane parallel to the axes of the tool T and work gear W and which direction in such plane may be parallel to the axis of the work or disposed at an angle thereto.

In modern gear finishing machines where high production is desired it is usual to associate the machine with automatic loading mechanism in which a sequence of gears is fed to the machine, usually in a loading chute, and transferred from the loading chute into a position in mesh with the tool T by a movable transfer device. When in working position in mesh with the tool T the work is engaged by the rotary work support by means of which it is supported during the finishing operation. Following the finishing operation the work is released and is allowed to roll down a discharge or unloading chute.

In some cases it is desirable to locate the discharge or unloading chute laterally with respect to the loading chute so as to avoid interference between gear-like members of unusual shape, or for other reasons.

Figure 2:
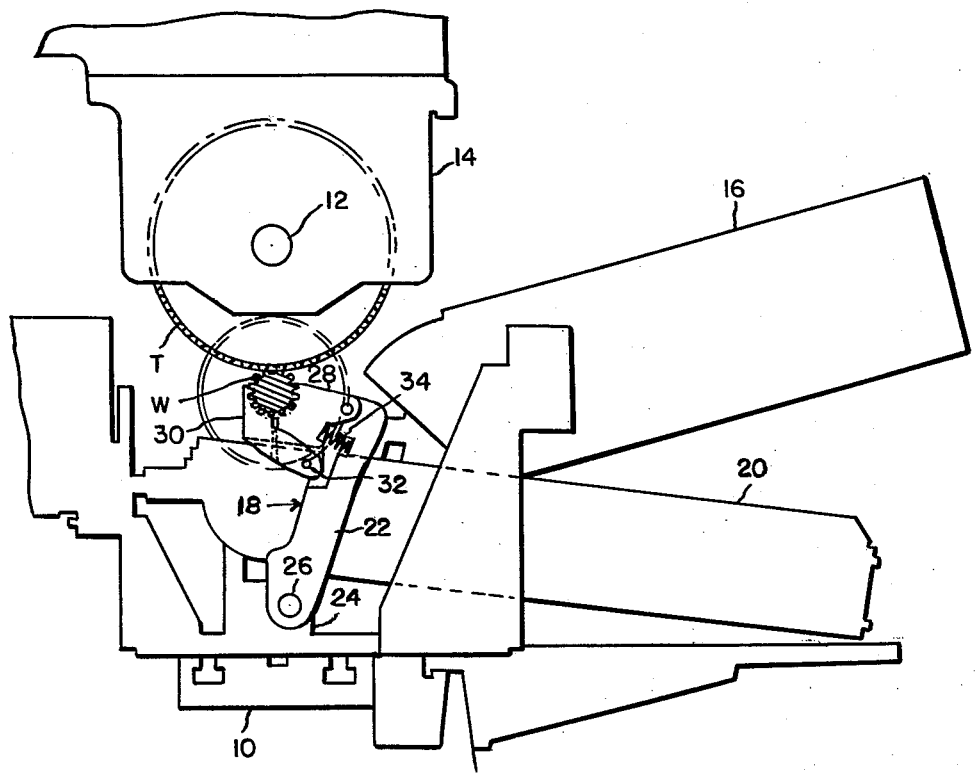
FIGURE 2 is a fragmentary side elevational view showing primarily, the location of loading and unloading chutes, and the transfer device of the automatic loading mechanism.

As best seen in FIGURE 2, the tool T is mounted on a drive shaft 12 carried by a head 14 of the gear finishing machine, the head being angularly adjustable about a vertical axis to position the tool at the desired crossed axes angle with respect to the work gear W. In this figure the table 10, which is mounted for reciprocation in a direction parallel to the axis of the work gear W, has mounted thereon the loading mechanism which includes the loading chute 16, transfer mechanism indicated generally at 18, and the unloading or discharge chute 20 which includes rails 21. The transfer mechanism is of course in alignment with the loading chute 16 and includes arms 22 pivoted to support structure 24 as indicated at 26. Pivoted to the upper end of the arms 22 is a holder including relatively movable jaws 28 and 30, the jaw 30 being pivoted to the jaw 28 as indicated at 32. The jaw 28 is urged in a clockwise direction as seen in FIGURE 2 by suitable means such as a compression spring 34. An additional spring interconnects the jaws 28 and 30 so as to clamp the work gear W lightly therebetween.

Suitable means (not shown) are provided for rocking the arms 22 in properly timed relation to cause the transfer device to pick up a work gear from the loading chute, move it into meshed engagement with the tool T, and after it has been engaged, return to a position in which it receives the next succeeding gear from the chute. The return movement is permitted by opening movement of the jaw 30 relative to the jaw 28.

This particular transfer mechanism is of a type more fully shown in Praeg Patent 2,692,535 granted October 26, 1954.

In the present case the work piece W has at one end of its toothed portion a relatively enlarged flange F and due to the presence of this flange, interference would result if the loading and unloading chutes 16 and 20 were disposed vertically above each other.

Referring again to FIGURE 1, it will be recalled that the arms 22 of the transfer device 18 are in alignment with the loading chute 16. On the other hand, the unloading chute 20, as clearly seen in FIGURE 1, is displaced substantially to the left of the loading chute which is in alignment with the transfer device including the arms 22.

Figure 1:
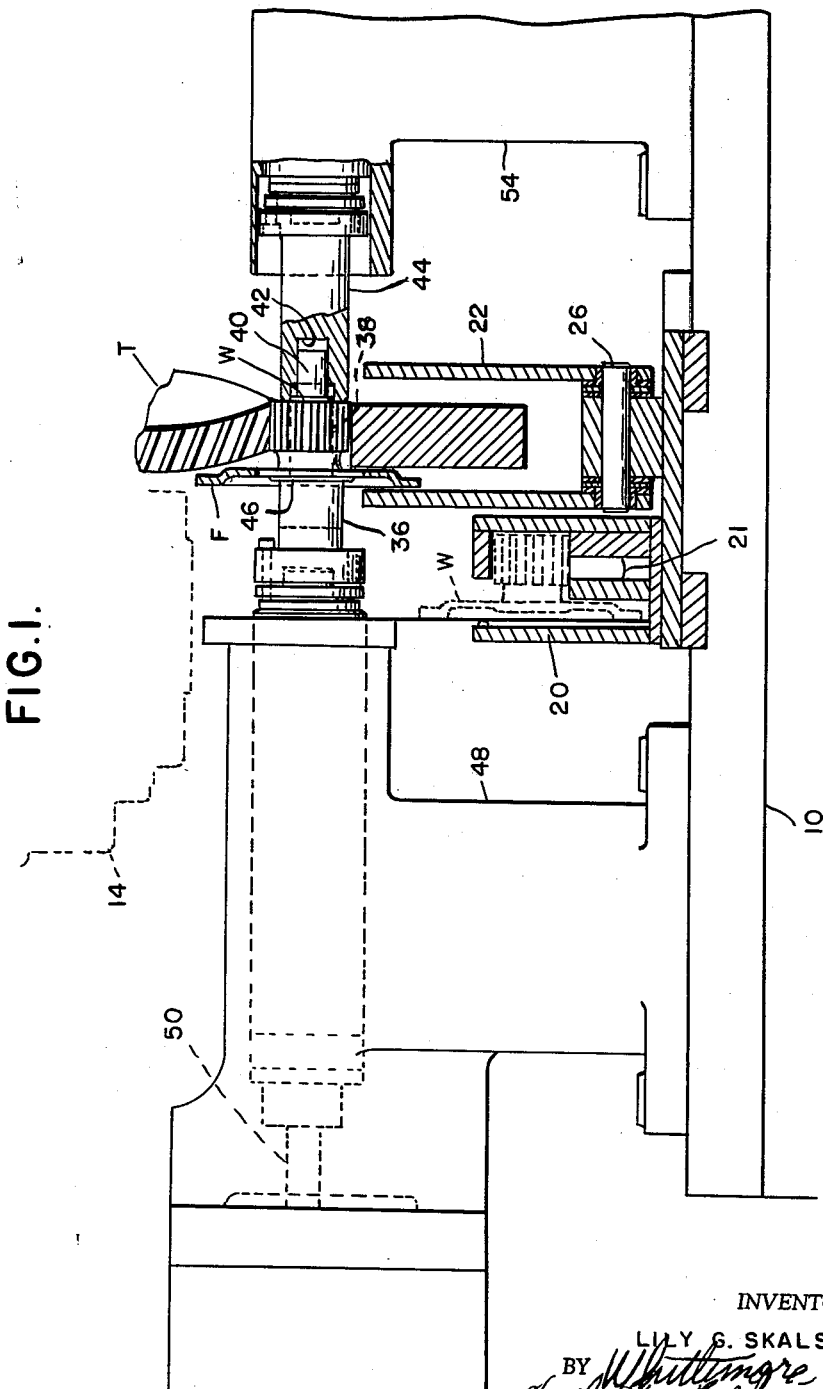
FIGURE 1 is a fragmentary elevational view with parts in section, of the significant portions of a gear finishing machine and loading mechanism associated therewith.

As noted in FIGURE 1, the work piece W is illustrated as supported in operating position on a rotary arbor 36 having a reduced portion 38 movable through the central opening in the gear, and a further reduced plug 40 receivable in an opening 42 in the end of a rotary member 44. The arbor 36 is provided with a shoulder 46 against which one end of the work piece W is pressed, the opposite end of the work piece being engaged by the annular surface at the end of the rotary member 44. The arbor 36 is not only mounted for free rotation, but is axially movable in the headstock 48 and is connected by a piston rod 50 to a piston 51 received in a cylinder diagrammatically indicated at 52 in FIGURES 3–8. In like manner, the rotary member 44 is supported in a tailstock 54 and is mounted for free rotation therein and for axial movement. The member 44 is connected to a piston rod 56, as diagrammatically illustrated in FIGURES 3–8, to a piston 58 movably received in cylinder 60.

In operation, fluid from the same source is applied alternately under controlled conditions to the cylinders 52 and 60. The cross-sectional area of the cylinder 52 is somewhat greater than that of the cylinder 60 so that when air is supplied to both tending to urge them in opposite directions, and when the arbor or movable members thereof are connected together, the piston 51, movable in the cylinder 52, is effective to overcome the piston 58.

The cylinders diagrammatically illustrated in FIGURES 3–8, are provided with abutments limiting movement of the pistons therein. These abutments may be constituted simply by the bottoms of the cylinders or end closures 62 and 64 as indicated in FIGURES 3–8, or they may of course include adjustable means controlling the strokes of the respective pistons in the cylinders. In any case, an automatic operation is provided by sequential and controlled admission of operating fluid to the cylinders, which is effective to carry out a desired program of movement as will now be described.

Figure 3:
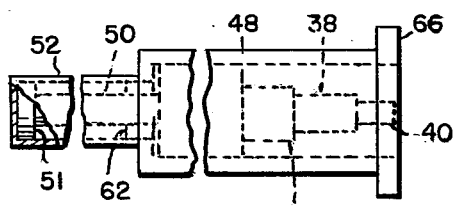
FIGURES 3–8 are more or less diagrammatic elevational views showing the sequence of movement of significant parts of the gear finishing machine and automatic loading mechanism.
Figure 3:
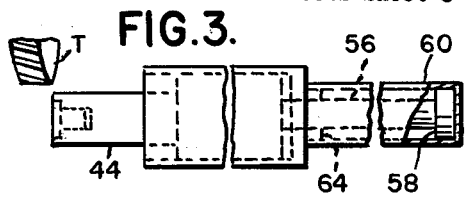

Referring first to FIGURE 3, the arbor 36 is shown as fully retracted into the headstock beyond a stripper plate 66 fixedly secured to the end of the headstock. The movable member 44 carried by the tailstock is in its fully retracted or furthest right position. It will be observed in this figure that the piston 51 is illustrated as bottomed in the cylinder 52, and the piston 58 is illustrated as bottomed in the cylinder 60. The location of the gear finishing tool T is shown.

Figure 4:
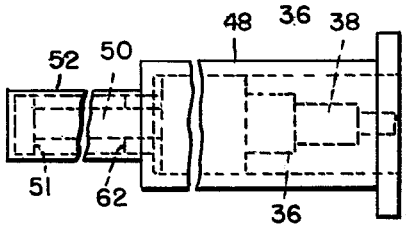
Figure 4:
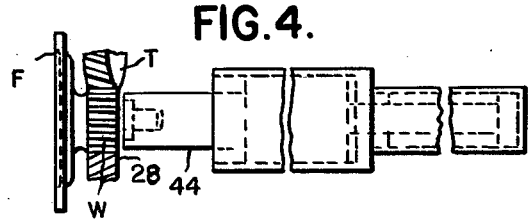

In FIGURE 4 the parts are in the same position as in FIGURE 3 except that at this time the work gear W has been moved into position with the toothed portion thereof in mesh with the tool T. At this time a portion of the jaw 28 of the transfer device is shown and it will be understood that the work piece W is supported in the position shown by means of the transfer device. At this time the right hand end of the work piece W is slightly spaced from the left hand end of the rotary member 44.

Figure 5:
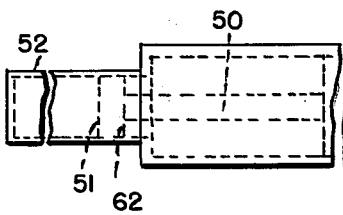
Figure 5:
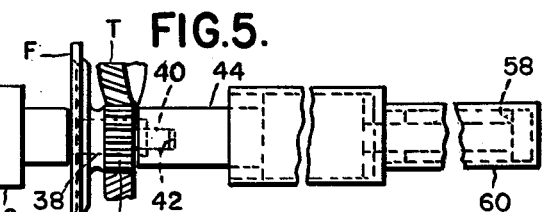

While the gear is thus properly supported in the operating position in mesh with the tool T, air is admitted to the left hand end of the cylinder 52 and shifts the arbor 36 to the position shown in FIGURE 5. The reduced portion 38 has passed through the opening in the work piece W and the plug 40 at the end of the arbor has entered into the opening 42 at the end of the rotary member 44. The position of the arbor 36 is determined at this time by engagement between the piston 51 and the abutment 62 at the right hand end of the cylinder 52. The piston 58 remains bottomed in the cylinder 60. The gear W at this time may be engaged by the end of member 44, or with the shoulder 46.

Figure 6:
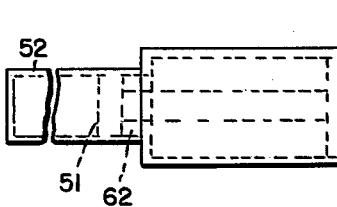
Figure 6:
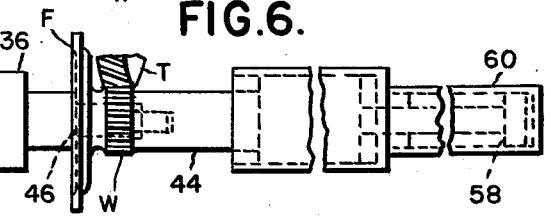

The next operation is the admission of air to the right hand end of the cylinder 60. This moves the piston 58 to the left as seen in FIGURE 6, to the position thereof illustrated at which time the left hand end of the rotary member 44 engages the right hand end of the work piece W and the work piece is thus effectively clamped between the rotary member 44 and the shoulder 46 provided on the arbor 36. This is the operating position in which the gear is firmly supported between the shoulder on the arbor 36 and the end of the rotary member 44. The position of the work piece W is at this time determined by the location of the piston 51 which remains in engagement with the inner abutment 62. This is because the cylinder 52 has a larger effective area than the cylinder 60 and hence, the total force acting on the piston 51 exceeds the force acting on the piston 58. It will be observed at this time that the piston 58 has moved away from the closed end of its cylinder a small amount. This small clearance is for the purpose of insuring freedom of movement of the work piece into the loading zone without interference by the end of the rotary member 44.

At this time the loading arm and jaw 20 is retracted, and with the work piece W supported in the position shown in FIGURE 6, the tool T is driven in rotation and limited axial traverse is applied to the table 10, as permitted without interference between the flange F and the tool T.

Figure 7:
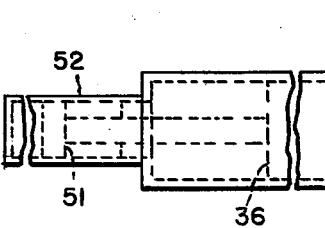
Figure 7:
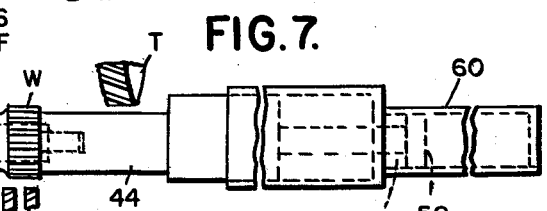

After the machining operation has been completed the supply of fluid under pressure to the cylinder 52 is cut off and the interior of the cylinder opened to exhaust while fluid under pressure remains supplied to the right hand end of the cylinder 60. The exhaust of fluid pressure from the left of the cylinder 52 permits the piston 58 to move to the left as seen in FIGURE 7, pushing the finished work gear to the left and also pushing the arbor 36 along with it. This movement continues until the piston 58 engages the abutment 64. The abutment 64 is located so that at this time the flange F of the work piece W is spaced slightly from the stripper palte 66, as illustrated in the figure.

With the parts in the position shown in FIGURE 7 it will be observed that the work piece W is above the rails 21 and has been substantially removed from the working space or station below the tool T. The piston 51 occupies an intermediate position in the cylinder 52.

Fluid under pressure is now admitted to the right of the piston 51 and the piston moves to the bottom of the cylinder 52, thus retracting the arbor 36 including the plug 40 entirely within an enlarged opening 68 in the stripper plate 66. Since the end of the rotary member 44 had come to rest when the piston 58 engaged the abutment 64 at a position such that clearance existed between the flange F of the workpiece and the outer face of the stripper plate 66, it will be understood that retraction of the arbor 36 leaves the work gear in a loose condition between the confronting faces of the stripper plate 66 and the rotary member 44. Accordingly, the finished work gear is released and drops down onto the rails 21 and rolls downwardly on the unloading or discharge chute 20.

The next operation, which is not illustrated, is the admission of air to the left of the piston 58 which retracts it to the position shown in FIGURE 3 and conditions the apparatus for reception of the next succeeding work gear.

Figure 8:
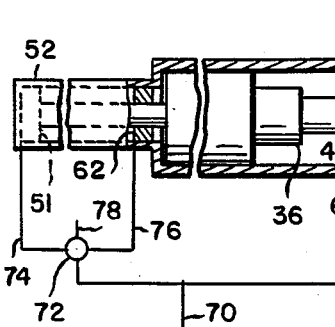
Figure 8:
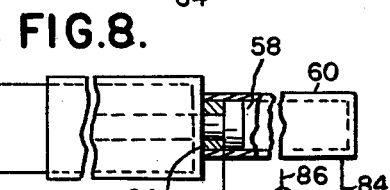

It is desired to emphasize the fact that the movement of the arbor 36 and rotary member 42 to the relative positions illustrated through FIGURES 3 and 8 is terminated in all cases by engagement of one or both of the pistons thereof against fixed abutments which limit their strokes.

Thus, in FIGURES 3 and 4, pistons 51 and 58 are both bottomed in their respective cylinders. In FIGURE 5 the piston 51 has moved through its full stroke and its position is determined by engagement with the abutment 62. In FIGURE 6 the piston 58 is urged to the left but is prevented from moving because the piston 51 is retained in engagement against the abutment 62 by the continued application of fluid pressure to cylinder 52. In FIGURE 7 the piston 58 has moved into engagement with the abutment 64 and has moved the piston 51 to an intermediate position in its cylinder. In FIGURE 8 the piston 52 is moved to a limiting position against the end closure of the cylinder 52.

For completeness, in FIGURE 8 there is shown a source of fluid such for example as air under pressure adapted to be suitably connected to opposite ends of the cylinders 52 and 60. There is diagrammatically indicated at line 70 leading from a source of air under pressure which connects to a three-way valve 72 provided with a first line 74 leading to the left hand end of the cylinder 52 and a line 76 leading to the right hand end of the cylinder 52. The valve is shown as having an exhaust line 78. Similarly, the three-way valve 80 is connected to the source of fluid under pressure and has a line 82 connected to the left hand end of the cylinder 60, a line 84 connected to the right hand end of the cylinder 60, and an exhaust line 86. Actuation of the three-way valve to carry out the operation in the sequence described above may be accomplished by conventional means such as solenoids or the like.

There is thus provided a very simple mechanism by means of which the work piece is engaged and rotatably supported in the working zone and after the finishing operation is moved axially to an unloading position displaced from the loading zone and there released.

While the present invention has been disclosed in connection with an embodiment in which the tool T is a gear finishing tool, it will of course be understood that the invention actually is applicable to other types of machines such as a gear speeder, gear checker, or the like. In the case of a gear speeder the "tool" as defined in the claims, will of course refer to a gear conjugate to the work gear and adapted to be rolled in mesh therewith. In the case of a gear checker the "tool" will be in the form of a master gear.

The drawings and the foregoing specification constitute a description of the improved automatic loading mechanism for gear finishing machines in such full, clear, concise and exact terms as to enable any person skilled in the art to practice the invention, the scope of which is indicated by the appended claims.

What I claim as my invention is:

1. Means for supporting an apertured work piece for rotation and axial movement comprising a first rotary member mounted for axial movement, first fluid pressure operated means including first rigid means connected to said first rotary member, a first rigid abutment engageable by a portion of said rigid means to determine two limiting positions of said first rotary member, a second rotary member mounted for axial movement toward and away from said first rotary member, second fluid pressure operating means including second rigid means connected to said second rotary member, a second rigid abutment engageable by a portion of the rigid means connected to said second rotary member to determine two limiting positions thereof, said first fluid pressure operated means having sufficient power to overcome said second fluid pressure operated means, a first valve for admitting fluid under pressure to said fluid pressure operated means to move said first member through the aperture in a work piece and to engage said first rigid abutment by said first rigid means, a second valve operable to admit fluid to said second fluid pressure operated means to move said second rotary member into engagement with the work piece to clamp the work piece between said rotary members, said first valve being operable following a machining operation to exhaust fluid from said first fluid pressure operated means to cause said second fluid pressure operated means to overcome said first fluid pressure operated means and to shift said first rotary member and the work piece axially to a position determined by engagement between said second rigid abutment and said second rigid means, said second valve being then operable to reverse the application of fluid pressure to said first fluid pressure operated means to move said first rotary member away from said second rotary member to release the work piece from clamped condition therebetween.

2. Means as defined in claim 1 comprising a stationary stripper member engaged by a work piece on said first rotary member during its movement away from said second rotary member.

3. A gear finishing machine comprising a frame, a tool support structure including a tool spindle for mounting a gear-like tool, a work support structure having work engaging means thereon for supporting a work piece for rotation in mesh with a gear-like tool on said tool spindle, means for moving a work piece in a direction perpendicular to its axis into mesh with the tool at a working position relative to said work support structure, a work locating and releasing abutment carried by said work support structure in position to be engaged by said work piece when shifted axially out of working position to a release position, said work engaging means comprising a pair of rotary, axially aligned work engaging members mounted on said work support structure for independent axial movement thereon, means for effecting relative axial approach between said members to engage the work piece and to support the work piece for rotation in mesh with the tool, means for thereafter shifting both of said members axially as a unit relative to said work support structure to move the work piece axially out of mesh with the gear-like tool, one of said members including carrying means capable of supporting the work piece independently of said other member which has an end portion for clamping said work piece on said one member, means for moving said one member axially away from said other member to carry the work piece against said abutment and thereafter to withdraw said one member from the work piece to release the work piece in said release position.

4. A machine defined in claim 3 in which the several means for effecting movement of said members comprises piston nad cylinder devices connected to said rotary axially aligned work engaging members and having abutment means limiting the strokes of said devices in both directions.

5. A machine defined in claim 4 wherein means are provided for establishing a greater effective force developed by one of said devices than by the other device.

6. A machine defined in claim 5 wherein means are provided for applying fluid simultaneously to said devices in a direction to cause said members to approach one another and grip the work piece between said rotary members at a location determined by the abutment means of the device developing the greater effective force.

7. Automatic mechanism for loading, finishing and unloading a series of work pieces comprising a rotary tool support having a gear-like rotary tool thereon, a work support structure including work engaging means for supporting an apertured work piece for rotation and axial movement between a working position adjacent said tool and an unloading position spaced from said working position, a loading chute in substantial alignment with said tool and said working position, a transfer device operable to receive work pieces successively from said loading chute and to move them in a direction perpendicular to their axes into mesh with said tool, said work engaging means comprising first and second rotary, axially aligned work engaging members mounted on said work support structure for independent axial movement thereon, fluid actuating devices connected to said rotary work engaging members, one of said actuating devices which is connected to said first rotary member including means for establishing a greater effective force than the other actuating device, means automatically operable in timed relation to the operation of said transfer device to advance said first rotary member axially through the aperture in the work piece, means operable thereafter to admit fluid to said other actuating device to advance said second rotary member axially into engagement with the work piece to clamp the work piece on said first rotary member, means operable upon completion of the finishing operation to release fluid pressure in said one actuating device to cause the other actuating device to axially shift said rotary members and the work piece as a unit relative to said work support structure to move the work piece axially out of mesh with the tool to an intermediate position between said loading and unloading positions, means operable thereafter which is effective to admit fluid under pressure to said one actuating device to shift said first rotary member away from said second rotary member so as to withdraw said first rotary member from the aperture in the work piece and thus to release the finished work piece at the unloading position, and a work locating and releasing abutment carried by said work support structure in position to be engaged by said work piece at the unloading position when said first rotary member is shifted axially away from said second rotary member and thereafter withdrawn from said work piece to release the work piece at the unloading position.

8. Automatic mechanism for loading, finishing and unloading a series of work pieces comprising a rotary tool support having a gear-like rotary tool thereon, a work support structure including work engaging means for supporting an apertured work piece for rotation and axial movement between a working position adjacent said tool and an unloading position spaced from said working position, a loading chute in substantial alignment with said tool and said working position, a transfer device operable to receive work pieces successively from said loading chute and to move them in a direction perpendicular to their axes into mesh with said tool, said work engaging means comprising first and second rotary, axially aligned work engaging members mounted on said work support structure for independent axial movement thereon, fluid actuating devices connected to said rotary work engaging members, means automatically operable in timed relation to the operation of said transfer device to advance said first rotary member axially through the aperture in the work piece, means operable thereafter to admit fluid to said other actuating device to advance said second rotary member axially into engagement with the work piece to clamp the work piece on said first rotary member, means operable upon completion of the finishing operation to release fluid pressure in said one actuating device to cause the other actuating device to axially shift said rotary members and the work piece as a unit relative to said work support structure to move the work piece axially out of mesh with the tool to an intermediate position between said loading and unloading positions, means operable thereafter which is effective to admit fluid under pressure to said one actuating device to shift said first rotary member away from said second rotary member so as to withdraw said first rotary member from the aperture in the work piece and thus to release the finished work piece at the unloading position, and a work locating and releasing abutment carried by said work support structure in position to be engaged by said work piece at the unloading position when said first rotary member is shifted axially away from said second rotary member and thereafter withdrawn from said work piece to release the work piece at the unloading position.

9. The mechanism defined in claim 8 which includes an unloading chute positioned laterally from said loading chute and disposed to receive the finished work piece upon release from said first rotary member.

10. The mechanism defined in claim 8 wherein each of said fluid actuating devices includes a piston and a cylinder, with the piston in said one device being larger in area than the other piston.

References Cited in the file of this patent
UNITED STATES PATENTS

| | | |
|---|---|---|
| 1,946,429 | Smith et al. | Feb. 6, 1934 |
| 1,950,040 | Smith et al. | Feb. 6, 1934 |
| 2,473,306 | Schreiber | June 14, 1949 |
| 2,546,684 | Ashton | Mar. 27, 1951 |
| 2,576,497 | Austin et al. | Nov. 27, 1951 |
| 2,649,032 | Moncrieff | Aug. 18, 1953 |
| 2,692,535 | Praeg | Oct. 26, 1954 |
| 2,951,401 | Johnson | Sept. 6, 1960 |